(12) United States Patent
Abram et al.

(10) Patent No.: US 7,243,623 B2
(45) Date of Patent: Jul. 17, 2007

(54) VELOCITY CONTROL OF EXHAUST VALVE ACTUATION

(75) Inventors: Kwin Abram, Columbus, IN (US); Joseph Callahan, Greenwood, IN (US)

(73) Assignee: Arvin Technologies, Inc., Troy, MI (US)

( * ) Notice: Subject to any disclaimer, the term of this patent is extended or adjusted under 35 U.S.C. 154(b) by 112 days.

(21) Appl. No.: 11/174,883

(22) Filed: Jul. 5, 2005

(65) Prior Publication Data

US 2007/0006829 A1   Jan. 11, 2007

(51) Int. Cl.
*F01L 9/04*      (2006.01)
(52) U.S. Cl. .............................. 123/90.11; 123/90.15; 251/129.01
(58) Field of Classification Search ............. 123/90.11, 123/90.15; 251/129.01
See application file for complete search history.

(56) References Cited

U.S. PATENT DOCUMENTS

| | | | | |
|---|---|---|---|---|
| 5,016,583 A | * | 5/1991 | Blish | ........................ 123/190.7 |
| 6,230,673 B1 | | 5/2001 | Sugimoto | |
| 6,477,993 B1 | | 11/2002 | Katsumata | |
| 6,527,006 B2 | | 3/2003 | Jackson | |

FOREIGN PATENT DOCUMENTS

| | | |
|---|---|---|
| EP | 0 307 639 A1 | 3/1989 |
| EP | 0 851 164 A2 | 7/1998 |
| EP | 1 130 300 A | 9/2001 |
| FR | 529 250 A | 11/1921 |
| FR | 2 712 027 A1 | 5/1995 |

OTHER PUBLICATIONS

Search Report Dated Dec. 6, 2006.

* cited by examiner

*Primary Examiner*—Thomas Denion
*Assistant Examiner*—Zelalem Eshete
(74) *Attorney, Agent, or Firm*—Carlson, Gaskey & Olds P.C.

(57) ABSTRACT

An exhaust valve assembly includes a valve body supported on a shaft for rotation within an exhaust component. The shaft is coupled to a solenoid with a linkage assembly. A controller controls the solenoid to rotate the shaft via the linkage assembly. The solenoid includes a plunger that moves between an actuation position and a release position. The controller utilizes pulse width modulation to control actuation and release of the plunger. This significantly reduces operational noises generated as the solenoid is moved between the actuation position and the release position.

22 Claims, 3 Drawing Sheets

VELOCITY CONTROL OF EXHAUST VALVE ACTUATION

TECHNICAL FIELD

The subject invention relates to a method and apparatus for controlling actuation movement of an exhaust valve to reduce noise and improve durability.

BACKGROUND OF THE INVENTION

Noise attenuation valves are often used in vehicle exhaust systems to reduce noise generated during vehicle operation. A noise attenuation valve typically includes a flapper valve mounted on a shaft that pivots the flapper valve within an inlet tube formed within an exhaust component, such as a muffler for example. The flapper valve has a disc shaped body that rotates within the inlet tube to vary exhaust gas flow area. The shaft is coupled to a solenoid with a linkage assembly. A controller controls the solenoid to rotate the shaft via the linkage assembly. As the shaft rotates, the flapper valve varies the exhaust gas flow area as needed to attenuate noise.

One disadvantage with this traditional configuration is that components in the noise attenuation valve and solenoid generate operational noise. For example, movement of the linkage assembly and rotation of the shaft can generate noises due to slack and clearance between the components.

Additionally, operational movement of the solenoid generates undesired noise. The solenoid includes a plunger that is coupled to the linkage assembly. When the solenoid is electrically actuated, an electronic voltage is used to generate a magnetic force that pulls the plunger in a first direction to position the flapper valve at a desired position. The plunger can move until a travel limit stop is reached. The velocity at which the plunger moves, and the force at which the travel limit stop is contacted, can generate undesirable noise. Further, when the electronic voltage is cut-off, a spring forces the plunger in a second direction, opposite of the first direction, to return the flapper valve to an initial position. This quick release of the plunger also generates undesirable noise and increases wear rates of associated exhaust valve components.

Thus, it is desirable to provide a method and apparatus for controlling movement of the actuator for an exhaust valve that reduces operational noises and reduces wear rates.

SUMMARY OF THE INVENTION

The subject invention provides an exhaust valve assembly with a control that varies actuation power levels by using pulse width modulation (PWM) to reduce operational noises. The exhaust valve assembly includes a valve body supported on a shaft for rotation within an exhaust component. The shaft is coupled to an actuator that moves between an actuation position and a release position. A controller controls the actuator to rotate the shaft to move the valve body. The controller uses PWM to vary velocity of the plunger for at least one of an actuation event or a release event to reduce noise generated during actuator movement.

In one example the controller provides a controlled release. The controller generates an initial power level when releasing the actuator and generates a subsequent power level that is different than the initial power level when moving the actuator to a fully released position. By controlling release velocity, operational noises are significantly reduced as the actuator is moved from the actuation position to the release position.

In another example the controller provides a controlled actuation. During initial movement of the actuation the controller generates a low power level, then power is increased during primary actuation, and then power is reduced as the actuator reaches an end of travel position, i.e. a maximum actuation position. The controller could also vary power during both actuation and release as the actuator moves back and forth between the actuation position and the release position.

In one example, the actuator comprises a solenoid with a plunger. The control actuates the solenoid to move the plunger in a first direction to move the solenoid to the actuation position. The solenoid includes a resilient return member that moves the plunger in a second direction opposite of the first direction when moving the solenoid to the release position. During actuation and/or release, the controller supplies at least a first voltage to the solenoid to generate a first magnetic force level and a second voltage to the solenoid to generate a second magnetic force level that is different than the first magnetic force level. The use of a variable magnetic force during actuation reduces noise generated during actuation. Further, the use of a varied magnetic force in combination with the resilient return member controls movement of the plunger toward a fully released position to reduce operational noise.

These and other features of the present invention can be best understood from the following specification and drawings, the following of which is a brief description.

DETAILED DESCRIPTION OF THE PREFERRED EMBODIMENT

Figure 1:
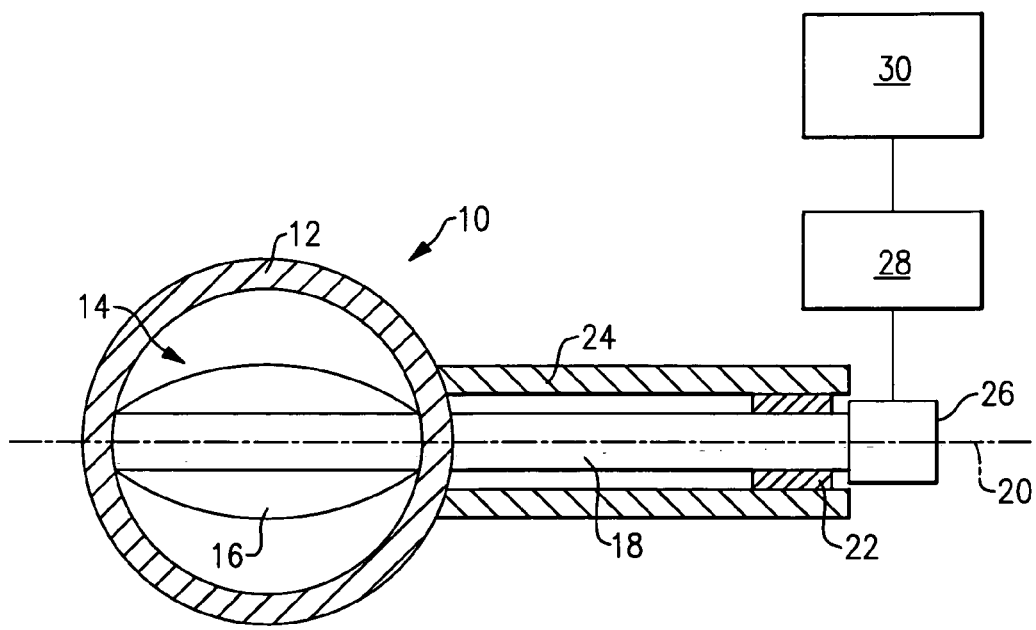
FIG. 1 is a schematic view of an exhaust system with a valve actuation control assembly incorporating the subject invention.

An exhaust system 10 is shown in FIG. 1. The exhaust system 10 includes an exhaust component 12, such as an inlet tube for a muffler for example, that directs the flow of exhaust gases from an engine (not shown). A noise attenuation valve 14 is positioned within the exhaust component 12 to reduce noise generated during vehicle operation. The noise attenuation valve 14 can be configured as an electric or vacuum type valve.

In the example shown, the noise attenuation valve 14 includes a flapper valve body 16 mounted on a shaft 18 that pivots the flapper valve body 16 within the exhaust component 12 about an axis 20. The flapper valve body 16 is usually a disc-shaped body and rotates within the exhaust component 12 to vary exhaust gas flow area, however, other valve configurations could also be used.

The shaft 18 is supported on a bushing assembly 22 that provides a bearing surface as the shaft 18 rotates relative to a housing 24. The shaft 18 is coupled by a linkage assembly 26 to an actuator 28, which controls movement of the shaft 18. As the shaft 18 rotates, the flapper valve body 16 varies the exhaust gas flow area as needed to attenuate noise. A controller 30 controls movement of the actuator 28. In the example shown, the actuator 28 is a solenoid 32 that includes a plunger 34 that is coupled to the shaft 18 by the linkage assembly 26 (see FIG. 2).

Figure 2:
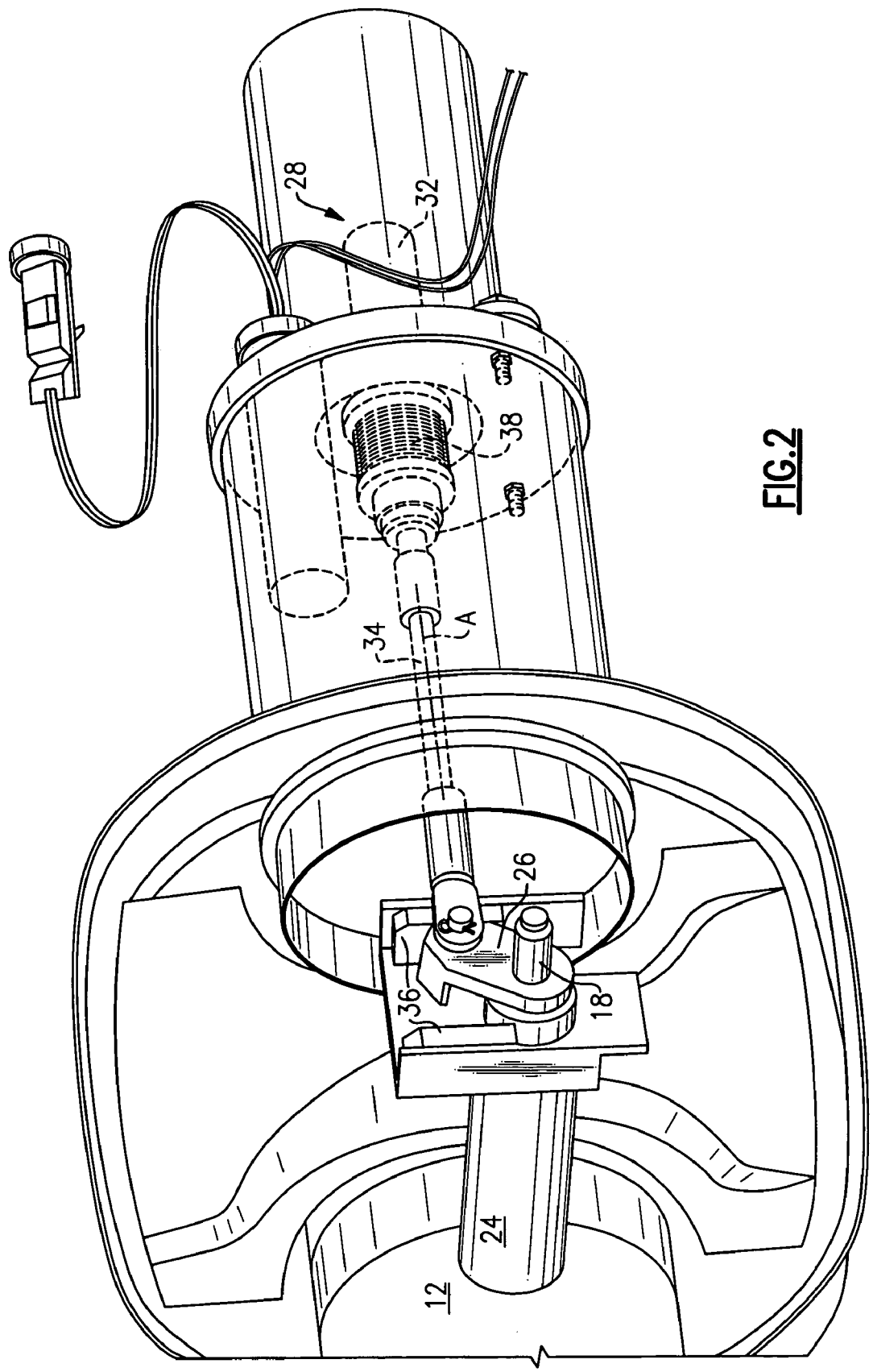
FIG. 2 is a perspective view of a valve actuator and control incorporating the subject invention.

The actuator 28 typically rotates or pivots the shaft 18 via the linkage assembly 26 back and forth between travel limit stops 36. When a voltage is applied to the solenoid 32, a magnetic force is applied to the plunger 34 that pulls the plunger 34 in an axial direction along axis A toward the right as shown in FIG. 2. This rotates the linkage assembly 26 in a clockwise direction until the rightmost travel limit stop 36 is reached. The solenoid 32 in FIG. 2 is shown in a "closed" or "actuation" position in FIG. 2.

When electric voltage is removed from the solenoid 32, a resilient return spring 38 forces the plunger 34 to move to the left as shown in FIG. 2. This rotates the linkage assembly 26 in a counter-clockwise direction and places the solenoid in a "release" or "unactuated" position. The linkage assembly 26 rotates until the leftmost travel limit stop 36 is reached.

The velocity at which the actuation of solenoid 32 occurs can generate undesirable noises. Further, the velocity at which the return spring 38 releases the solenoid to return the plunger 34 to an initial or unactuated position can also generate noise. Additionally, the velocity at which components hit the travel limit stops 36 can affect component durability and further generate noise.

To reduce these operational noises and to improve component durability, the controller 30 varies the power, e.g. voltage/current, during at least one of actuation and release to provide finely controlled movement of the plunger 34. The controller 30 applies a first voltage level actuating the plunger 34 and applies a second voltage level when releasing the plunger 34. During release and actuation, multiple voltage variations could be generated by the controller 30. By controlling voltage levels during release of the solenoid 32, the return spring 38 still returns the plunger 34 to the release position, but the time period during which this event occurs is longer than if the return spring 38 was used by itself. Further, the force at which the release occurs is also significantly less than if the return spring 38 were used alone.

Figure 3:
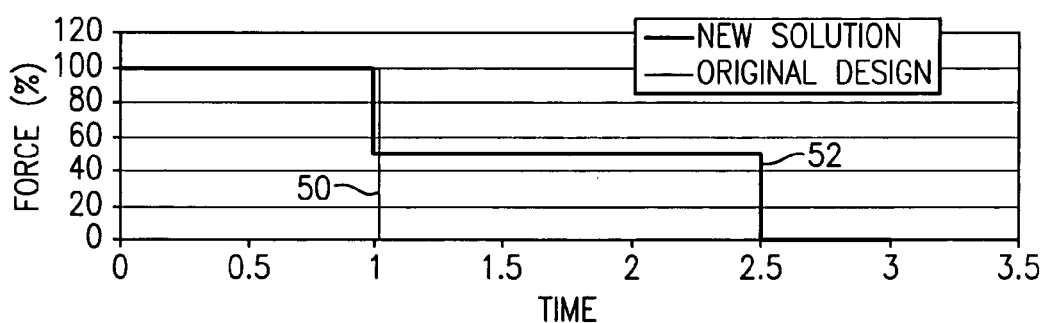
FIG. 3 is a graph indicating Force Levels vs. Time for actuator release.

FIG. 3 shows an example of a force level vs. time for actuator release comparing use of the return spring 38 alone and using the return spring 38 in combination with a reduced operational voltage. The line at 50 indicates a force level for the return spring 38 alone. In this example, the force level is at 100% of the maximum current required for one second and then immediately drops to a 0% force level. The line at 52 indicates a force level for the return spring 38 in combination with a reduced operational voltage. In the example shown, the force level is at 100% of the maximum current required for just under 1 second and then drops to approximately 50% for another 1.5 seconds where the force level then drops to 0%.

Figure 4:
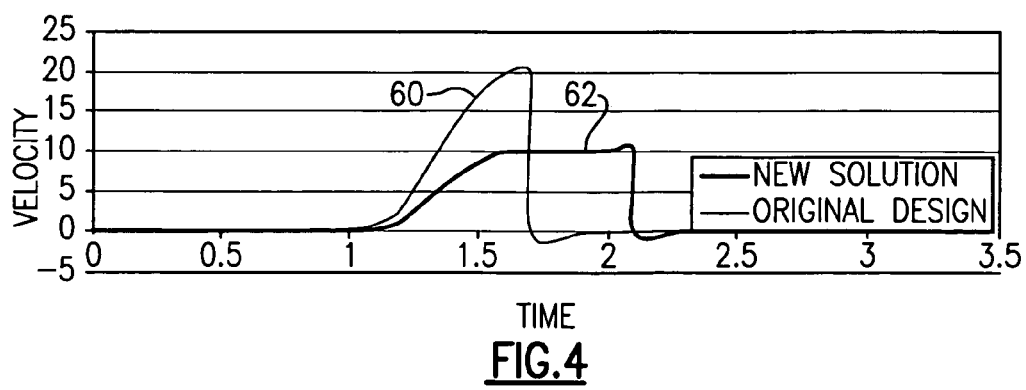
FIG. 4 is a graph indicating Velocity vs. Time during a release event.

FIG. 4 shows an example of velocity vs. time for actuator release. The line at 60 indicates a velocity over time for the return spring 38 alone. In this example, the velocity starts out at 0 for just over 1 second and reaches a maximum velocity level indicated at 20 at a time of about 1.7 seconds, and then immediately drops back to 0. The line at 62 indicates a velocity over time for the return spring 38 in combination with a reduced operational voltage. In this example, the velocity starts out at 0 for just over 1 second and then reaches a maximum velocity level indicated at 10 until just over 2 seconds have passed from initiation of release, and then drops back to 0.

Figure 5:
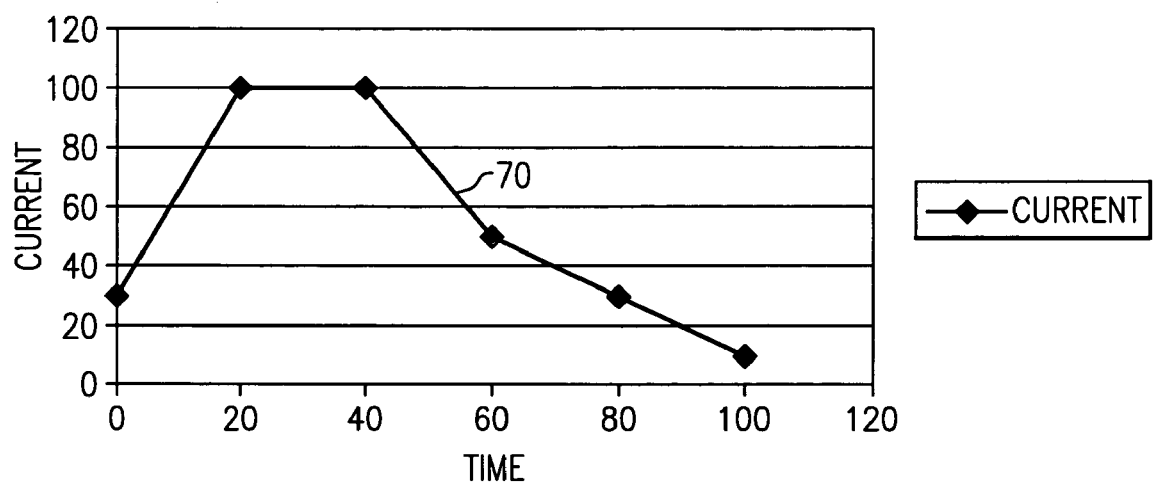
FIG. 5 is a graph indicating a controlled actuation event.

While FIGS. 3 and 4 show force and velocity levels during release, it should be understood that the controller 30 could also vary power during actuation to slow movement of the plunger 34 just prior to reaching a travel limit stop 36 as shown at 70 in FIG. 5.

As shown in FIG. 5, during initial movement of the actuation the controller 30 generates a low power level, then power is increased during primary actuation, and then power is reduced as the actuator 28 reaches an end of travel position, i.e. a maximum actuation position. In the example shown, current is initially at 30% of the maximum force, then increases to 100% a mid-actuation, and then decreases from 100% down to 10% at an end of actuation. This further assists in reducing operational noises during valve actuation. It should be understood that the current levels and time periods shown in FIG. 5 are just one example configuration, and that other current and time period combinations could be used as needed.

Also, the examples shown in FIGS. 3 and 4 for the return spring 38 in combination with a reduced voltage are just one example configuration. It should be understood that the force levels, time intervals, and velocities could be varied to other levels, and additionally multiple variations could also occur between a fully applied position and a fully released position, or vice-versa.

The controller 30 controls movement of the plunger 34 by using pulse width modulation (PWM). A voltage is applied in a series of pulses generated by ON and OFF events. When OFF there is no voltage applied, and when ON a level of voltage is applied as desired. Typically, this voltage level can be up to 12 volts. These pulses or excitation voltages can be ON and OFF for different time percentages to achieve different duty cycles as needed. Frequency of switching between ON and OFF events of the duty cycles is also modulated as needed. An upper bound of frequency can be as high as 100,000 Hertz. A lower bound of frequency is dictated by system response requirements. Typically, this lower bound would not be lower than 100 Hertz.

In the subject invention, PWM is used to control movement of the solenoid 32. In the solenoid 32, magnetic force is proportional to power flowing through the solenoid 32. By varying voltage, the velocity and force level for movement of the plunger 34 is easily controlled to very precise movements. This reduces operational noises and improves component durability.

The controller 30 can use PWM to only control plunger movement during actuation or to only control plunger movement during release. The controller 30 could also vary power during both actuation and release as the plunger moves between the actuation position and the release position.

The force and velocity levels at which the controller 30 moves the plunger 34 can be tuned or varied for different vehicle applications. Further, the force and velocity levels can be tuned or varied on a specific vehicle in response to vehicle input parameters such as road speed, engine speed, throttle position, braking, stereo volume, etc.

Finally, it should be understood that while the subject control system is shown as being used in a noise attenuation valve 14 positioned in an inlet tube for a muffler, the control system could be used for valves located in other exhaust components.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An exhaust valve assembly comprising:
   a valve body;
   a support shaft coupled to said valve body to position said valve body for movement within an exhaust component to vary exhaust flow area;
   an actuator coupled to said support shaft, said actuator providing actuation and release events to rotate said valve body, wherein said actuator comprises a solenoid; and
   a controller that varies power supplied to said actuator during at least one of an actuation and release event to reduce noise generated by movement of said actuator, and wherein said controller varies power supplied to said solenoid using pulse width modulation by generating at least a first power level and a second power level different than the first vower level during the same actuation or release event.

2. The exhaust valve assembly according to claim 1 wherein said first and second power levels comprise first and second magnetic force levels and wherein said controller supplies a first voltage to said solenoid to generate said first magnetic force level and supplies a second voltage to said solenoid to generate said second magnetic force level, said second voltage being different than said first voltage.

3. The exhaust valve assembly according to claim 1 including a resilient member coupled to said actuator to move said actuator from an actuation position to a release position wherein said first power level is generated as said actuator begins to move from the actuation position toward the release position and said second power level is generated as said actuator nears a fully released position.

4. The exhaust valve assembly according to claim 1 including a resilient member coupled to said actuator to move said actuator from an actuation position to a release position and wherein said at least one of an actuation and release event comprises a release event with said resilient member returning said actuator from the actuation position to a fully released position in a first time period when no power is being supplied to said solenoid, and said resilient member returning said actuator from the actuation position to the fully released position in a second time period when power is being supplied to said solenoid, said second time period being greater than said first time period.

5. The exhaust valve assembly according to claim 1 including a resilient member coupled to said actuator to move said actuator from an actuation position to a release position and wherein said at least one of an actuation and release event comprises a release event with said resilient member moving said actuator from the actuation position to a fully released position at a first speed when no power is being supplied to said solenoid, and said resilient member moving said actuator from the actuation position to the fully released position at a second speed when power is being supplied to said solenoid, said second speed being less than said first speed.

6. The exhaust valve assembly according to claim 1 wherein said solenoid includes a plunger that moves along an axis and a linkage that connects said plunger to said support shaft, said plunger pivoting said support shaft via said linkage as said actuator moves between an actuation position and a release position.

7. The exhaust valve assembly according to claim 1 wherein said at least one of an actuation and release event comprises an actuation event and wherein said actuator has a travel limit at a maximum actuation position and wherein said first power level comprises at least a first actuation force for primary actuation and said second power level comprises at least a second actuation force that is generated as said actuator nears said travel limit, said second actuation force being less than said first actuation force.

8. The exhaust valve assembly according to claim 7 wherein said first and second actuation forces comprise first and second magnetic force levels and wherein said controller supplies a first voltage to said solenoid to generate said first magnetic force level and supplies a second voltage to said solenoid to generate said second magnetic force level, said second voltage being less than said first voltage.

9. The exhaust valve assembly according to claim 7 including a third actuation force for an initial actuation prior to said primary actuation, said third actuation force being less than said first actuation force.

10. A method for controlling actuation of an exhaust valve assembly comprising:
    (a) coupling an actuator to an exhaust valve assembly to move the exhaust valve assembly between an actuation position during an actuation event and a release position during a release event; and
    (b) varying power during at least one of the actuation event and the release event to reduce noise generated by actuator movement by
      (b1) generating a first power level when moving the actuator during the at least one of the actuation and release events; and
      (b2) generating a second power level subsequent to step (b1) that is different than the first power level during the same actuation and release event.

11. The method according to claim 10 wherein the at least one of the actuation and release events comprises an actuation event and wherein the first power level comprises at least a first actuation force and the second power level comprises at least a second actuation force that is less than the first actuation force, said step (b1) further including generating the first actuation force for primary actuation of the exhaust valve assembly, and said step (b2) further including generating the second actuation force as the actuator nears an end of travel position.

12. The method according to claim 11 including generating a third actuation force prior to step (b1) at an initial actuation prior to the primary actuation of the exhaust valve assembly, the third actuation force being less than the first actuation force.

13. The method according to claim 10 wherein the actuator comprises a solenoid and wherein the first and second power levels comprise first and second magnetic force levels and wherein step (b1) includes supplying a first voltage to the solenoid to generate the first magnetic force level and wherein step (b2) includes supplying a second voltage to the solenoid to generate the second magnetic force level, the second voltage being different than the first voltage.

14. The method according to claim 10 including performing steps (b1) and (b2) by using pulse width modulation.

15. The method according to claim 10 wherein the at least one of the actuation and release events comprises a release event and wherein the first power level comprises at least a first release force and the second power level comprises at least a second release force, said step (b1) further including generating the first release force for primary release of the exhaust valve assembly, and said step (b2) further including generating the second release force as the actuator nears an end of travel position.

16. The method according to claim 11 including performing steps (b1) and (b2) during actuation and release events.

17. The method according to claim 10 including performing steps (b1) and (b2) only during release events.

18. The method according to claim 10 including performing steps (b1) and (b2) only during actuation events.

19. An exhaust valve assembly comprising:
- a valve body comprising a flapper valve that is pivotable within an exhaust component housing;
- a support shaft coupled to said valve body to position said flapper valve for movement within the exhaust component housing to vary exhaust flow area;
- an actuator coupled to said support shaft, said actuator providing actuation and release events to rotate said valve body, wherein said actuator includes an extendible shaft that is coupled to said support shaft via a linkage assembly that is movable between a pair of travel limit stops; and
- a controller that varies power supplied to said actuator during at least one of an actuation and release event to reduce noise generated by movement of said actuator, and wherein said controller varies power using pulse width modulation by generating at least a first power level and a second power level different than the first power level during the same actuation or release event.

20. The exhaust valve assembly according to claim 19 wherein said first power level comprises a low power level that is applied as said linkage assembly initially moves away from one of said pair of travel limit stops, said second power level comprises a higher power level than said first power level that is applied during a primary actuation range of movement of said flapper valve, and including a third power level that comprises a lower power level than said second power level that is applied as said linkage assembly moves toward the other of said pair of travel limit stops.

21. The exhaust valve assembly according to claim 1 wherein said solenoid is movable between a pair of travel limit stops and wherein said first power level comprises a low power level that is applied during initial movement away from one of said pair of travel limit stops, said second power level comprises a higher power level than said first power level that is applied during a primary actuation range of movement of said valve body, and including a third power level that comprises a lower power level than said second power level that is applied during movement toward the other of said pair of travel limit stops.

22. The method according to claim 10 wherein the actuator is movable between a pair of travel limit stops and including defining the first power level as a low power level that is applied as the actuator moves away from one of the pair of travel limit stops, defining the second power level as a higher power level than the first power level that is applied during a primary actuation range of movement of the exhaust valve assembly, and applying a third power level that comprises a lower power level than the second power level as the actuator moves toward the other of the pair of travel limit stops.

* * * * *

UNITED STATES PATENT AND TRADEMARK OFFICE
CERTIFICATE OF CORRECTION

PATENT NO. : 7,243,623 B2
APPLICATION NO. : 11/174883
DATED : July 17, 2007
INVENTOR(S) : Abram et al.

It is certified that error appears in the above-identified patent and that said Letters Patent is hereby corrected as shown below:

Claim 1, Column 5, line 17: "vower" should read as --power--

Signed and Sealed this

Sixteenth Day of October, 2007

JON W. DUDAS
*Director of the United States Patent and Trademark Office*